United States Patent

Bernard et al.

[11] Patent Number: 5,993,995
[45] Date of Patent: Nov. 30, 1999

[54] PASTE TYPE NICKEL ELECTRODE CONTAINING A COBALT COMPOUND AND AT LEAST ONE OTHER ELEMENT

[75] Inventors: Patrick Bernard, Massy; Françoise Bertrand, Ris Orangis; Olivier Simonneau, Dourdan, all of France

[73] Assignee: SAFT, Romainville, France

[21] Appl. No.: 08/852,054

[22] Filed: May 6, 1997

[30] Foreign Application Priority Data

May 7, 1996 [FR] France .................................. 96 05716

[51] Int. Cl.$^6$ ...................................................... H01M 4/32
[52] U.S. Cl. ............................................. 429/223; 423/594
[58] Field of Search ............................. 429/223; 423/594

[56] References Cited

U.S. PATENT DOCUMENTS

| | | | |
|---|---|---|---|
| 5,514,497 | 5/1996 | Furukawa | 429/223 |
| 5,571,636 | 11/1996 | Ohta et al. | 429/218 |
| 5,660,952 | 8/1997 | Yano et al. | 429/223 |
| 5,700,596 | 12/1997 | Ikoma et al. | 429/206 |
| 5,702,844 | 12/1997 | Bernard et al. | 429/223 |
| 5,804,334 | 9/1998 | Yamamura et al. | 429/223 |

FOREIGN PATENT DOCUMENTS

| | | |
|---|---|---|
| 0587973A1 | 3/1994 | European Pat. Off. . |
| 0696076A1 | 2/1996 | European Pat. Off. . |
| 0723305A1 | 7/1996 | European Pat. Off. . |
| WO9411910 | 5/1994 | WIPO . |

OTHER PUBLICATIONS

Database WPI, Week 9647, Derwent Publication Ltd., London, AN 96–474130 corresponding to JP–A–08 241 713 (Sanyo Electric Co., Ltd.) dated Sep. 17, 1996.

*Primary Examiner*—Maria Nuzzolillo
*Assistant Examiner*—Jennifer O'Malley
*Attorney, Agent, or Firm*—Sughrue, Mion, Zinn Macpeak & Seas, PLLC

[57] ABSTRACT

The present invention provides a paste type nickel electrode for a storage cell having an alkaline electrolyte, the electrode comprising a current collector and a paste containing a nickel-based hydroxide and an oxidized compound of cobalt syncrystallized with at least one other element, wherein said hydroxide forms a first powder and wherein said compound forms a second powder distinct from said first powder, said powders being mixed mechanically within said paste.

13 Claims, No Drawings

PASTE TYPE NICKEL ELECTRODE CONTAINING A COBALT COMPOUND AND AT LEAST ONE OTHER ELEMENT

The present invention relates to a nickel electrode of the paste type, for use, in particular, as a positive electrode in a storage cell having an alkaline electrolyte. The invention also extends to a method of preparing it.

BACKGROUND OF THE INVENTION

Several types of electrode exist that are suitable for use in an alkaline electrolyte storage cell such as a pocket type electrode, a sintered type electrode, or a paste type electrode, also known as a non-sintered type electrode. The electrodes in most widespread use at present are of the paste type. Compared with the other types of electrode, a paste type electrode contains a greater quantity of active material, so its capacity per unit volume is higher, and its manufacturing cost is lower.

A paste type electrode is made by depositing a paste either on a two-dimensional conductive support such as an expanded metal, a grid, a cloth, or a solid or a perforated sheet, or else in a porous three-dimensional conductive support such as a felt or a metal or a carbon foam. The main components of the paste are the active material, generally in the form of a powder, and a polymer binder, to which there is often added a conductive material. During manufacture of the electrode, a volatile solvent is added to the paste to alter its viscosity so as to make it easier to shape. Once the paste has been deposited on or in the support, the assembly is compressed and dried to obtain an electrode of the desired density and thickness.

In a paste type nickel electrode, the active material is constituted by a nickel-based hydroxide. Nickel hydroxide is a poor conductor and requires the electrode to include a material that enables electricity to percolate well.

Proposals have also been made to add a powdered conductive material to the paste, for example a cobalt compound such as metallic cobalt Co, cobalt hydroxide $Co(OH)_2$, and/or cobalt oxide, $CoO$. During the first charge, this compound oxides into cobalt oxyhydroxide $CoOOH$ in which the cobalt is raised to oxidation state +3. This oxyhydroxide is stable in the normal operating range of the nickel positive electrode and it is insoluble in the alkaline electrolyte (KOH). It provides electrical percolation for the electrode.

When stored in the completely discharged state, an alkaline storage cell possessing a paste type nickel positive electrode suffers from its voltage decreasing over time. When stored for more than a few months, cell voltage tends towards 0 volts. Under such conditions, the cobalt oxyhydroxide $COOOH$ reduces slowly. The cobalt is initially taken to oxidation state +2.66 in $Co_3O_4$, and then it reaches oxidation state +2 in $Co(OH)_2$.

Unfortunately, cobalt hydroxide $Co(OH)_2$ is very soluble in the electrolyte. Consequently, after a storage period of several months, a loss of conductivity is observed due to the percolation network of the paste electrode being partially dissolved. This gives rise to an irreversible loss of capacity that can exceed 10%. This loss occurs whatever the cobalt compound that was initially included in the paste.

An electrode has been described in which the surface of the particles of nickel hydroxide is covered in cobalt hydroxide. However, during cycling, the cobalt hydroxide diffuses into the particles of nickel hydroxide and the capacity of the electrode decreases. In order to solve that problem, document EP-0 696 076 proposes covering the surface of the nickel hydroxide in a mixture of crystals comprising cobalt hydroxide and a hydroxide of at least one metal selected from aluminum, magnesium, indium, and zinc. That makes it possible to reduce the diffusion of cobalt hydroxide while not eliminating it completely. That solution also suffers from the drawback of making the method of manufacturing the active material more complex.

OBJECTS AND SUMMARY OF THE INVENTION

An object of the present invention is to provide a paste type electrode with significantly less irreversible loss of capacity during storage than with presently known electrodes.

Another object of the invention is to provide an electrode of the paste type in which the manufacturing method is simplified.

The present invention provides a paste type nickel electrode for a storage cell having an alkaline electrolyte, the electrode comprising a current collector and a paste containing a nickel-based hydroxide and an oxidized compound of cobalt syncrystallized with at least one other element, wherein said hydroxide forms a first powder and wherein said compound forms a second powder distinct from said first powder, said powders being mixed mechanically within said paste.

The oxidized compound based on cobalt is thus not directly in contact with the particles of nickel hydroxide, and consequently the risk of diffusion is eliminated. Also, the cobalt based compound is added merely by mixing powders.

Naturally, the term "nickel hydroxide" used in the present application means not only nickel hydroxide but also a hydroxide that contains mostly nickel but also at least one syncrystallized hydroxide of a metal selected from cobalt, cadmium, zinc, calcium, and magnesium.

In the electrode of the invention, said oxidized compound of cobalt is at oxidation state +2 and can be raised to oxidation state +3 during the first charge, said other element being selected in such a manner that while said electrode is stored in contact with said electrolyte, the reducibility of said compound is less than that of a compound containing cobalt only.

At oxidation state +2, the cobalt compound of the invention oxidizes during the first charge into an oxyhydroxide which is electrochemically more stable and thus less reducible under the same conditions as an oxyhydroxide of cobalt that does not contain the syncrystallized element. The term "more stable" is used to mean that the compound of the invention, when raised to oxidation state +3, withstands reduction better, mainly because it reduces at a slower rate than cobalt. Consequently, for storage over an equivalent duration, the irreversible loss of capacity is significantly less than that observed for cobalt at oxidation state +3.

Preferably, said oxidized compound of cobalt at oxidation state +2 is selected from a cobalt oxide and a cobalt hydroxide. When the oxidized compound of cobalt is cobalt oxide containing a syncrystallized element, it can be obtained by dehydrating the corresponding cobalt hydroxide.

In a preferred implementation, the oxidized compound of cobalt contains at least one syncrystallized element selected from: antimony, silver, aluminum, barium, calcium, cerium, chromium, copper, tin, iron, lanthanum, manganese, magnesium, lead, scandium, silicon, titanium, and yttrium.

Preferably, the oxidized compound of cobalt contains a proportion of said element lying in the range 0.5% to 30% by weight of said compound. Above 30%, no significant reduction in capacity loss during storage is observed.

In an embodiment of the electrode of the invention, the current collector is a nickel foam and said paste contains said active material, said conductive material, a first binder based on polytetrafluoroethylene (PTFE), and a second binder selected from carboxymethylcellulose (CMC), and hydroxypropylmethylcellulose (HPMC).

The present invention also provides a method of manufacturing an electrode, the method including the following steps performed under a non-oxidizing atmosphere:

a-an aqueous solution is made containing a salt of cobalt and a salt of said other element;

b-a strong base is added slowly to said solution to precipitate said compound;

c-said compound is allowed to remain in said solution for a period lying in the range 1 hour to 10 hours;

d-said compound is separated from said solution by filtering, washing, and drying; and e-said compound is ground.

All of the above steps are performed under an inert atmosphere in order to avoid any contact with oxygen so as to mitigate the risks of oxidizing the resulting cobalt hydroxide.

In a variant implementation of the invention, the ratio of the weight of said element to the weight of cobalt in said aqueous solution is identical to that of said oxidized compound of cobalt that is to be obtained.

Preferably, the aqueous solution is maintained at a temperature lying in the range 20° C. to 80° C.

Preferably, the strong base is added in the form of an aqueous solution, with the duration of the addition lying in the range 15 minutes to 60 minutes.

Preferably, drying is performed at a temperature lying in the range 40° C. to 80° C.

In the aqueous solution, the cobalt salt and the salt of said other element can be identical or different. Preferably, the cobalt salt is selected from a nitrate, a sulfate, and a chloride of cobalt, and the salt of said other element is selected from a nitrate, a sulfate, and a chloride of said other element.

MORE DETAILED DESCRIPTION

The invention will be better understood and other advantages and features will appear more clearly on reading the following examples given by way of non-limiting illustration.

EXAMPLE 1

An electrode was made that does not form part of the present invention, containing cobalt hydroxide fabricated as follows. A precipitation reactor was used having a double wall to enable its temperature to be regulated uniformly, together with a stirring device including a moving member and stationary blades enabling the hydrodynamic conditions of the synthesis to be controlled.

The reactor was placed under an inert atmosphere and maintained at a constant temperature of 50° C., and 0.5 liters (l) of an aqueous solution of cobalt sulfate at a concentration of 1 M were added. 650 grams (g) of a solution of caustic soda NaOH at a concentration of 2 M were added continuously at a constant rate for a period of 30 minutes. After the caustic soda had been added, the solution was maintained under constant stirring and heating for 2 hours in order to ripen the particles of cobalt hydroxide. The resulting precipitate was then filtered using a Buchner funnel and washed at ambient temperature with distilled water under an inert atmosphere. The precipitate was then dried under a vacuum for 24 hours at a temperature of 70° C. after the drying oven had been swept with an inert gas. The product was then ground under an inert atmosphere.

A paste was made whose composition expressed in weight percentage relative to the weight of paste was approximately as follows:

a hydroxide powder comprising mostly nickel, containing about 2% syncrystallized cobalt hydroxide and about 4% syncrystallized zinc hydroxide: 66%;

metallic Co: 1%;

an oxidized compound of cobalt constituted by cobalt hydroxide $Co(OH)_2$ obtained using the above-described method: 6%;

water: 25.4%;

a CMC-based gel: 0.1%;

PTFE: 1.5%.

A nickel electrode was made by inserting said paste in a nickel foam having porosity of about 95%. A cylindrical storage cell I of sealed nickel-cadmium type having the AA (or R6) format was assembled containing the previously made nickel electrode together with a cadmium electrode of known type and of capacity greater than that of the nickel electrode. The two spiral-wound electrodes were separated by means of a layer of non-woven polyamide. The storage cell was impregnated with an alkaline electrolyte made up of an aqueous solution of 9.1 M potassium hydroxide KOH and 0.2 M lithium hydroxide LiOH.

After resting for 48 hours, the storage cell was subjected to an electrochemical cycling test under the following conditions:

cycle 1: charge at 0.1 Ic for 10 hours at 20° C., where Ic is the current required to discharge the nominal capacity Cn of a storage cell in 1 hour; discharge at 0.1 Ic down to a stop voltage of 1 volt;

cycle 2: charge at 0.2 Ic for 7.5 hours at 20° C.; discharge at 0.2 Ic down to 1 volt;

cycle 3: charge at Ic for 1.2 hours at 20° C.; discharge at Ic down to 1 volt.

Storage cell I was then stored in the discharged state at ambient temperature. After about 2 months, it was observed that the voltage of the cell had become less than the stability voltage of nickel oxyhydroxide (1.05 V).

After 6 months of storage, the remaining capacity was measured under the following conditions:

cycles 4 to 9: charge at Ic for 1.2 hours at 20° C.; discharge at Ic down to 1 volt.

Its capacities per unit mass, relative to the weight of the mixture comprising the nickel-based hydroxide, the oxidized compound of cobalt, and the metallic cobalt are given in Table 1. It can be seen that the irreversible loss of capacity due to prolonged storage of cell I having an electrode containing an oxidized compound of cobalt without a syncrystallized element was 11%.

EXAMPLE 2

An electrode of the present invention was made containing an oxidized compound of cobalt constituted by a cobalt-based hydroxide including 3% by weight of syncrystallized magnesium hydroxide. The cobalt hydroxide was obtained by a precipitation method analogous to that described in Example 1, with the exception that 0.5 1 1 of an aqueous solution of cobalt and magnesium sulfate at a concentration of 1 M was added to the reactor.

A paste analogous to that described in Example 1 was made, with the exception that it contained 6% of the oxidized compound of cobalt as previously prepared, i.e. a cobalt hydroxide containing syncrystallized magnesium.

A nickel electrode was made in the manner described in Example 1. A storage cell II containing said electrode was assembled in the manner described in Example 1, and cycling was performed identical to that of Example 1.

The capacities per unit mass relative to the weight of the mixture of the nickel-based hydroxide, the oxidized compound of cobalt, and metallic cobalt are given in Table 1. It can be seen that the oxidized compound of cobalt made in this way is an excellent conductive compound for the nickel electrode having a foam support and that the syncrystallization of the magnesium does not alter electrochemical efficiencies under discharge conditions of 0.2 Ic or of Ic. In addition, it can be seen that the irreversible loss of capacity due to prolonged storage of cell II was only 4%, which is 64% less than for cell I.

EXAMPLE 3

An electrode of the present invention was made containing an oxidized compound of cobalt constituted by a cobalt-based hydroxide including 6% by weight of syncrystallized magnesium hydroxide. The cobalt hydroxide was obtained by a precipitation method analogous to that described in Example 1, with the exception that 0.5 l of an aqueous solution of cobalt and magnesium sulfate at a concentration of 1 M was added.

A paste analogous to that described in Example 1 was made, with the exception that it contained 6% of the oxidized compound of cobalt as previously prepared, i.e. a cobalt hydroxide containing syncrystallized magnesium.

A nickel electrode was made in the manner described in Example 1. A storage cell III containing said electrode was assembled in the manner described in Example 1, and cycling was performed identical to that of Example 1.

The capacities per unit mass relative to the weight of the mixture of the nickel-based hydroxide, the oxidized compound of cobalt, and metallic cobalt are given in Table 1. It can be seen that the oxidized compound of cobalt made in this way is an excellent conductive compound for the nickel electrode having a foam support and that the syncrystallization of the magnesium does not alter electrochemical efficiencies under discharge conditions of 0.2 Ic or of Ic. In addition, it can be seen that the irreversible loss of capacity due to prolonged storage of cell III was only 4%, which is 64% less than for cell I. A magnesium doped cobalt hydroxide is thus an excellent compound making it possible to ensure good percolation for the nickel electrode having a foam support and whose oxidation product is more stable than a standard oxyhydroxide of cobalt, when the cell is maintained at potentials below the redox potential of the $Co_3O_4$/CoOOH couple.

EXAMPLE 4

An electrode of the present invention was made containing an oxidized compound of cobalt constituted by a cobalt-based hydroxide including 1.5% by weight of syncrystallized aluminum hydroxide. The cobalt hydroxide was obtained by a precipitation method analogous to that described in Example 1, with the exception that 0.5 l of an aqueous solution of cobalt and aluminum sulfate at a concentration of 1 M was added.

A paste analogous to that described in Example 1 was made, with the exception that it contained 6% of the oxidized compound of cobalt as previously prepared, i.e. a cobalt hydroxide containing syncrystallized aluminum.

A nickel electrode was made in the manner described in Example 1. A storage cell IV containing said electrode was assembled in the manner described in Example 1, and cycling was performed identical to that of Example 1.

The capacities per unit mass relative to the weight of the mixture of the nickel-based hydroxide, the oxidized compound of cobalt, and metallic cobalt are given in Table 1. It can be seen that the oxidized compound of cobalt made in this way is an excellent conductive compound for the nickel electrode having a foam support and that the syncrystallization of the aluminum does not alter electrochemical efficiencies under discharge conditions of 0.2 Ic or of Ic. In addition, it can be seen that the irreversible loss of capacity due to prolonged storage of cell IV was only 7%, which is 36% less than for cell I.

EXAMPLE 5

An electrode of the present invention was made containing an oxidized compound of cobalt constituted by a cobalt-based hydroxide including 3% by weight of syncrystallized aluminum hydroxide. The cobalt hydroxide was obtained by a precipitation method analogous to that described in Example 1, with the exception that 0.5 l of an aqueous solution of cobalt and aluminum sulfate at a concentration of 1 M was added.

A paste analogous to that described in Example 1 was made, with the exception that it contained 6% of the oxidized compound of cobalt as previously prepared, i.e. a cobalt hydroxide containing syncrystallized aluminum.

A nickel electrode was made in the manner described in Example 1. A storage cell V containing said electrode was assembled in the manner described in Example 1, and cycling was performed identical to that of Example 1.

The capacities per unit mass relative to the weight of the mixture of the nickel-based hydroxide, the oxidized compound of cobalt, and metallic cobalt are given in Table 1. It can be seen that the irreversible loss of capacity due to prolonged storage of cell V is only 8%, i.e. 27% less than for cell I. Aluminum doped cobalt hydroxide is thus an excellent compound enabling good percolation to be ensured or the nickel electrode having a foam support and whose oxidation product is more stable than a standard oxyhydroxide of cobalt while the cell is maintained at potentials lower than the redox potential of the $Co_3O_4$/CoOOH couple.

TABLE 1

| Cell | I | II | III | IV | V |
| --- | --- | --- | --- | --- | --- |
| Cycle 2 capacity (mAh/g) | 214 | 217 | 213 | 218 | 215 |
| Cycle 3 capacity (mAh/g) | 207 | 206 | 201 | 208 | 205 |
| Cycle 9 capacity (mAh/g) | 184 | 197 | 192 | 194 | 189 |

Naturally, the present invention is not limited to the embodiments described, and numerous variants are available to the person skilled in the art without going beyond the spirit of the invention. In particular, without going beyond the ambit of the invention it would be possible to vary the composition of the paste and to include therein additives known to the person skilled in the art.

We claim:

1. A paste type nickel electrode, the electrode comprising a current collector and a paste containing a nickel-based hydroxide and an oxidized compound of cobalt syncrystallized with at least one other element, wherein said hydroxide forms a first powder and wherein said compound forms a second powder distinct from said first powder, said powders having been mechanically mixed within said paste.

2. An electrode according to claim 1, in which said oxidized compound of cobalt is at oxidation state +2 and can be raised to oxidation state +3 during the first charge, said other element being selected in such a manner that while said electrode is stored in contact with an alkaline electrolyte, the reducibility of said compound is less than that of a compound containing cobalt only.

3. An electrode according to claim 1, in which said oxidized compound of cobalt is selected from the group consisting of a cobalt oxide and a cobalt hydroxide.

4. An electrode according to claim 1, in which said other element is selected from the group consisting of antimony, silver, aluminum, barium, calcium, cerium, chromium, copper, tin, iron, lanthanum, manganese, magnesium, lead, scandium, silicon, titanium, and yttrium.

5. An electrode according to claim 3, in which said compound contains a proportion of said other element lying in the range 0.5% to 30% by weight of said compound.

6. An electrode according to claim 1, in which said current collector is a nickel foam and said paste further contains a first binder based on polytetrafluoroethylene, and a second binder selected from the group consisting of carboxymethylcellulose and hydroxypropylmethylcellulose.

7. A method of manufacturing the electrode of claim 1, comprising the following steps performed under a non-oxidizing atmosphere:

a-an aqueous solution is made containing a salt of cobalt and a salt of said other element;

b-a base is added slowly to said solution to precipitate said compound;

c-said compound is allowed to remain in said solution for a time period in the range of 1 hour to 10 hours;

d-said compound is separated from said solution by filtering, washing, and drying; and e-said compound is ground to form said second powder.

8. A method according to claim 7, in which the ratio of the weight of said other element to the weight of cobalt in said aqueous solution is identical to the ratio of the weight of said other element to the weight of cobalt in said compound.

9. A method according to claim 7, in which said aqueous solution is maintained at a temperature in the range of 20° C. to 80° C.

10. A method according to claim 7, in which said base is added in the form of an aqueous solution, the duration of addition being in the range of 15 minutes to 60 minutes.

11. A method according to claim 7, in which said drying is performed at a temperature in the range of 40° C. to 80° C.

12. A method according to claim 7, in which said salt of cobalt is selected from the group consisting of a nitrate, a sulfate, and a chloride.

13. A method according to claim 7, in which said salt of said other element is selected from the group consisting of a nitrate, a sulfate, and a chloride.

* * * * *